United States Patent
Suzuki et al.

(10) Patent No.: US 12,459,067 B2
(45) Date of Patent: Nov. 4, 2025

(54) CNC MACHINING DEVICE

(71) Applicant: HEXAGON METROLOGY KABUSHIKI KAISHA, Sagamihara (JP)

(72) Inventors: Satoshi Suzuki, Hamamatsu (JP); Masahiro Suzuki, Hamamatsu (JP); Katsuhiro Sato, Hamamatsu (JP); Christoph Wiest, Waldburg (DE); Andreas Hieble, Waldburg (DE); Pete Champ, Cobham (GB)

(73) Assignee: HEXAGON METROLOGY KABUSHIKI KAISHA, Sagamihara (JP)

( * ) Notice: Subject to any disclaimer, the term of this patent is extended or adjusted under 35 U.S.C. 154(b) by 537 days.

(21) Appl. No.: 17/910,324

(22) PCT Filed: Mar. 9, 2020

(86) PCT No.: PCT/JP2020/010004
§ 371 (c)(1),
(2) Date: Sep. 8, 2022

(87) PCT Pub. No.: WO2021/181461
PCT Pub. Date: Sep. 16, 2021

(65) Prior Publication Data
US 2023/0140343 A1 May 4, 2023

(51) Int. Cl.
*B23Q 3/157* (2006.01)
(52) U.S. Cl.
CPC ............... *B23Q 3/15713* (2013.01)
(58) Field of Classification Search
CPC ............ B23Q 17/20; B23Q 17/2471; B23Q 3/15713; G05B 19/401;
(Continued)

(56) References Cited

U.S. PATENT DOCUMENTS

2008/0051927 A1 2/2008 Prestidge
2010/0018069 A1 1/2010 Ould
(Continued)

FOREIGN PATENT DOCUMENTS

JP 2007-518579 A 2/2008
JP 2008-70143 A 3/2008
(Continued)

OTHER PUBLICATIONS

European Search Report dated Oct. 24, 2023 as received in application No. 20923849.

*Primary Examiner* — Tameem D Siddiquee
(74) *Attorney, Agent, or Firm* — Maschoff Brennan (57) ABSTRACT

Provided is a CNC machining device capable of more accurately measuring a shape of an object.

The CNC machining device 1 includes a tool magazine 20, a spindle 26, an automatic tool replacing device, a CNC controller 32, a sensor head 10 configured to generate measurement data corresponding to a distance from a surface of the object, and a personal computer 40. The sensor head 10 generates measurement data (X, Z) at regular intervals. The CNC controller 32 generates position coordinate data (x, y, z, xθ, yθ, zθ) at regular intervals. The sensor head 10 transmits the measurement data to the personal computer 40 through first radio communication RC1. The sensor head 10 transmits a synchronization signal for synchronizing the measurement data and the position coordinate data to the CNC controller 32 through second radio communication RC2.

13 Claims, 8 Drawing Sheets

(58) Field of Classification Search
CPC ........... G05B 2219/37198; G05B 2219/50249; G05B 2219/50252; G05B 2219/50257
See application file for complete search history.

(56) References Cited

U.S. PATENT DOCUMENTS

| | | | |
|---|---|---|---|
| 2010/0139506 A1* | 6/2010 | Jose | B30B 15/26 |
| | | | 700/206 |
| 2011/0170534 A1* | 7/2011 | York | H04J 3/0667 |
| | | | 702/89 |
| 2014/0177769 A1* | 6/2014 | Buechner | H04J 3/0658 |
| | | | 375/356 |
| 2019/0375066 A1 | 12/2019 | Suzuki et al. | |

FOREIGN PATENT DOCUMENTS

| | | | |
|---|---|---|---|
| JP | 2008-76200 A | 4/2008 | |
| JP | 2010-519533 A | 6/2010 | |
| JP | 2013-88341 A | 5/2013 | |
| JP | 2018-87749 A | 6/2018 | |
| WO | WO-2018101268 A1 * | 6/2018 | ............. B23Q 17/20 |

* cited by examiner

CNC MACHINING DEVICE

TECHNICAL FIELD

The present invention relates to a CNC machining device that machines an object using computer numerical control.

BACKGROUND ART

Conventionally, there has been known a CNC machining device capable of machining a workpiece (an object) through computer numerical control. After the workpiece is machined by the CNC machining device, a shape of the workpiece is measured to check an accuracy with which the workpiece is machined. As a device for measuring a shape of a workpiece, devices disclosed in, for example, Patent Literatures 1 and 2 have been known.

The measurement device disclosed in Patent Literature 1 replaces a tool used for machining with a contact sensor such as a touch probe, after a cutting process is finished by the CNC machining device. Next, a gauge head of the touch probe is brought into contact with a surface of the workpiece to measure a distance from the surface of the workpiece. Based on numerical data acquired by the touch probe, a surface shape of the workpiece can be measured.

The measurement device disclosed in Patent Literature 2 replaces a tool used for machining with a non-contact sensor capable of measuring a distance from a surface using laser light, after a cutting process is finished by the CNC machining device. Based on measurement data acquired by the non-contact sensor, a surface shape of the workpiece can be measured.

CITATION LIST

Patent Literature

Patent Literature 1: JP 2013-088341 A
Patent Literature 2: JP 2018-87749 A

SUMMARY OF INVENTION

Technical Problem

The measurement device disclosed in Patent Literature 2 includes a tool magazine that houses a plurality of tools, and is capable of replacing a tool by the automatic tool replacing device according to what process is to be performed. The tool magazine houses a sensor for measuring a surface shape of a workpiece as well as the plurality of tools. A tool used for machining can be replaced with the sensor by the automatic tool replacing device. Specifically, a tool mounted on a rotation shaft of the CNC machining device can be replaced with the sensor. The sensor can transmit measurement data corresponding to a distance from a surface of the workpiece to a personal computer through radio communication.

According to the measurement device disclosed in Patent Literature 2, after the workpiece is machined by the CNC machining device, a shape of the workpiece can be measured in succession at a location where the workpiece is machined. Therefore, there is no need to move the machined workpiece to another measurement device, resulting in a great reduction in work load in measuring the shape of the workpiece.

In the measurement device disclosed in Patent Literature 2, data indicating a surface shape of an object is generated by the personal computer based on data indicating a position and an orientation of the rotation shaft of the CNC machining device (hereinafter, such data may be referred to as "position coordinate data") and measurement data output from the sensor mounted on the rotation shaft. Since the position coordinate data and the measurement data are acquired by the NC device and the sensor, respectively, it is necessary to synchronize these two types of data. In order to synchronize the data, a time at which the position coordinate data is acquired (NC control time data) and a time at which the measurement data is acquired (sensor time data) are used. By using the time data, the position coordinate data and the measurement data acquired at the same time point can be combined, thereby accurately measuring a surface shape of the object.

An object of the present invention is to improve a measurement accuracy of a CNC machining device. Specifically, an object of the present invention is to provide a CNC machining device capable of more accurately synchronizing data indicating a position and an orientation of a rotation shaft with measurement data output from a sensor mounted on the rotation shaft, and more accurately measuring a shape of an object (workpiece).

Solution to Problem

The solution to the aforementioned problem is the following invention.

(1) A CNC machining device measuring a surface shape of an object after machining the object with a tool includes:
a housing unit configured to house a plurality of tools; a rotation shaft configured to rotate the tool; an automatic tool replacing device configured to replace the tool mounted on the rotation shaft with one of the plurality of tools housed in the housing unit; a CNC controller configured to control an operation of the rotation shaft; a measurement unit configured to generate measurement data corresponding to a distance from a surface of the object; and a processing device connected to the CNC controller,
in which the automatic tool replacing device is configured to replace the tool mounted on the rotation shaft with the measurement unit,
the measurement unit generates the measurement data at regular intervals,
the CNC controller generates position coordinate data indicating a position and an orientation of the rotation shaft at regular intervals, and
the measurement unit transmits the measurement data to the processing device through first radio communication, and transmits a synchronization signal for synchronizing the measurement data with the position coordinate data to the CNC controller through second radio communication.

(2) The CNC machining device according to (1), in which the measurement unit outputs the synchronization signal once every unit of one-time measurement.

(3) The CNC machining device according to (1), in which the measurement unit outputs the synchronization signal multiple times within a unit of one-time measurement.

(4) The CNC machining device according to any one of (1) to (3), in which the measurement unit outputs the synchronization signal once at the time of starting measurement.

(5) The CNC machining device according to any one of (1) to (4), in which the measurement unit includes an acceleration sensor, and marks the measurement data for synchronization when an acceleration greater than or equal to a predetermined value is detected by the acceleration sensor.

(6) The CNC machining device according to any one of (1) to (5), in which the processing device synchronizes the measurement data and the position coordinate data based on the synchronization signal.

(7) The CNC machining device according to any one of (1) to (6), in which the processing device generates surface shape data of the object based on the measurement data and the position coordinate data.

Advantageous Effects of Invention

According to the present invention, it is possible to provide a CNC machining device capable of more accurately synchronizing data indicating a position and an orientation of the rotation shaft with data output from the sensor mounted on the rotation shaft, and more accurately measuring a shape of an object (workpiece).

DESCRIPTION OF EMBODIMENTS

Hereinafter, a CNC machining device according to an embodiment of the present invention will be described with reference to the drawings.

Figure 1:
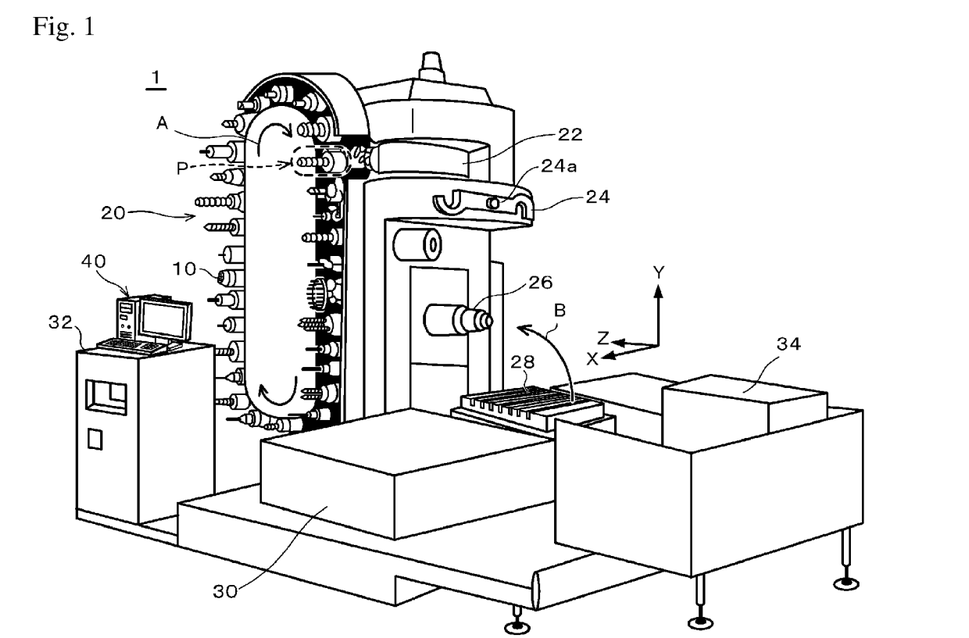
FIG. 1 is a perspective view illustrating an exterior of a CNC machining device.

FIG. 1 is a perspective view illustrating an exterior of a CNC machining device according to the present embodiment. The CNC machining device may also be referred to as a machining center. A CNC machining device 1 includes a tool magazine 20, an intermediate arm 22, an auto tool changer (ATC) arm 24, a spindle 26, a pallet 28, a table 30, a CNC controller 32, and a cutting oil tank 34.

The tool magazine 20 houses a plurality of types of tools. The tool magazine 20 can rotate these tools in a direction indicated by an arrow A in FIG. 1. The tool magazine 20 can move a tool to be used for machining to a predetermined position P.

The intermediate arm 22 takes out the tool moved to the predetermined position P from the tool magazine 20 and hands over the tool to the ATC arm 24. The ATC arm 24 rotates about an axis 24a to mount the tool received from the intermediate arm 22 on the spindle 26. If another tool has already been mounted on the spindle 26, the ATC arm 24 mounts the tool received from the intermediate arm 22 on the spindle 26 after removing the already-mounted tool from the spindle 26. The tool removed from the spindle 26 is returned to the predetermined position P of the tool magazine 20 by the intermediate arm 22.

The tool magazine 20 corresponds to a "housing unit" of the present invention. The intermediate arm 22 and the ATC arm 24 correspond to an "automatic tool replacing device" of the present invention. The spindle 26 corresponds to a "rotation shaft" of the present invention.

An object to be processed (hereinafter referred to as a "workpiece") is placed and fixed on the pallet 28. The pallet 28 rises by turning in a direction indicated by an arrow B in FIG. 1 so that the workpiece faces the tool mounted on the spindle 26. The table 30 moves the pallet 28 in X-axis, Y-axis, and Z-axis directions in FIG. 1 in accordance with a control signal output from the CNC controller 32. Further, the CNC controller 32 outputs, to the table 30, a control signal for inclining the spindle 26 with respect to the workpiece W. Thus, for example, in a case where the CNC device is capable of 5-axis control, the spindle 26 can be inclined in two axial directions with respect to the workpiece W. In this manner, the CNC machining device 1 can rotate the tool by means of the spindle 26 and control a relative position and a relative orientation of the spindle 26 with respect to the workpiece by means of the CNC controller 32.

After the machining of the workpiece is completed, a sensor head 10 housed in the tool magazine 20 is moved to the predetermined position P. Next, the tool attached to the spindle 26 is replaced with the sensor head 10 placed at the predetermined position P by the intermediate arm 22 and the ATC arm 24. Next, the CNC controller 32 changes a relative position (x, y, z) and a relative orientation (xθ, yθ, zθ) of the spindle 26 with respect to the workpiece in accordance with a preset pattern. Here, xθ indicates an inclination of the spindle 26 about the x axis. yθ indicates an inclination of the spindle 26 about the y axis. zθ indicates a rotational position of the spindle 26. Note that the pallet 28 is moved only in the x-axis, y-axis, and z-axis directions during measurement. Meanwhile, the sensor head 10 outputs measurement data (X, Z) including information regarding a distance to the workpiece every predetermined time interval (e.g., every 10 milliseconds). A personal computer 40 generates shape data indicating a shape of the workpiece based on the measurement data (X, Z) output from the sensor head 10 and the data (x, y, z, xθ, yθ, zθ) indicating the position and the orientation of the spindle 26 with respect to the workpiece. The sensor head 10 corresponds to a "measurement unit" of the present invention. The personal computer 40 corresponds to a "processing device" of the present invention.

The sensor head 10 will be described in more detail with reference to FIG. 2. FIG. 2(a) is a front view of the sensor head 10. FIG. 2(b) is a side view of the sensor head 10. FIG. 2(c) is a perspective view illustrating an exterior of the sensor head 10. As illustrated in FIGS. 2(a) to 2(c), the sensor head 10 includes a main body 12 and a collet chuck 18. A part for measuring a distance to the workpiece is installed in the main body 12. The collet chuck 18 is attachable/detachable to/from the spindle 26.

A light emitting window 14 and a light receiving window 16 are provided at a front end (a left end in FIG. 2(b)) of the main body 12. Laser light L emitted from a non-contact sensor installed in the main body 12 is irradiated toward the workpiece W after passing through the light emitting window 14. Laser light R (reflected light) reflected by a surface of the workpiece W passes through the light receiving window 16.

The collet chuck 18 is attached to a rear end (a right end in FIG. 2(b)) of the main body 12. The collet chuck 18 has the same shape as the tool housed in the tool magazine 20. The collet chuck 18 makes it possible to attaching the sensor head 10 to the spindle 26, like the other tools.

The oil-resistant/waterproof function of the sensor head 10 is preferably IP64 or higher in IP notation. That is, it is preferable that a protection grade for a human body and a solid (first symbol) is "6" or more (dust-resistant type), and a protection grade for water intrusion (second symbol) is "4" or more (protection against splashes).

Figure 3:
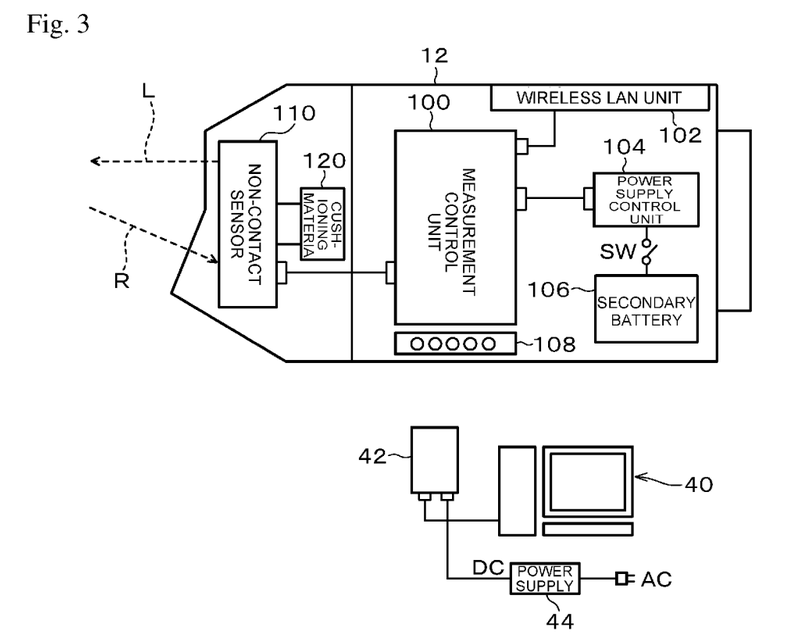
FIG. 3 is a block diagram illustrating an interior of the sensor head.

A configuration of each unit provided in the main body 12 of the sensor head 10 will be described with reference to FIG. 3. A measurement control unit 100, a wireless LAN unit 102, a power supply control unit 104, a secondary battery 106, a monitor 108, a non-contact sensor 110, and a cushioning material 120 are provided inside the main body 12. The measurement control unit 100 acquires data output from the non-contact sensor 110, for example, every 10 milliseconds. The measurement control unit 100 generates measurement data (X, Z) including information regarding a distance to the workpiece W every time the data output from the non-contact sensor 110 is acquired. The measurement control unit 100 transmits the generated measurement data to the personal computer 40 via the wireless LAN unit 102. Since the measurement data has a large size, it is preferable to use Wi-Fi for the wireless LAN unit 102.

The measurement data transmitted from the wireless LAN unit 102 is received through a wireless LAN unit 42 connected to the personal computer 40. The received measurement data is accumulated in a hard disk or the like in the personal computer 40. A power supply 44 converts AC power into DC power, and supplies the power to the personal computer 40 and the wireless LAN unit 42.

The non-contact sensor 110 is fixed in the main body 12 via the cushioning material 120. While the sensor head 10 is removed from the spindle 26, the sensor head 10 may vibrate. In addition, while the sensor head 10 is moved between the spindle 26 and the tool magazine 20, the sensor head 10 may vibrate. The cushioning material 120 can protect the non-contact sensor 110 from such vibrations applied to the sensor head 10.

The monitor 108 includes a plurality of LEDs. Each of the LEDs is turned on or off depending on whether each of various signals in the measurement control unit 100 is in a turn-on state or in a turn-off state. An operation state of the measurement control unit 100 can be confirmed based on whether each of the LEDs is in a turn-on state or in a turn-off state. In addition, whether the measurement control unit 100 is connected to the wireless LAN unit 102, the power supply control unit 104, and the non-contact sensor 110 can be checked based on whether each of the LEDs is in a turn-on state or in a turn-off state.

Figure 4:
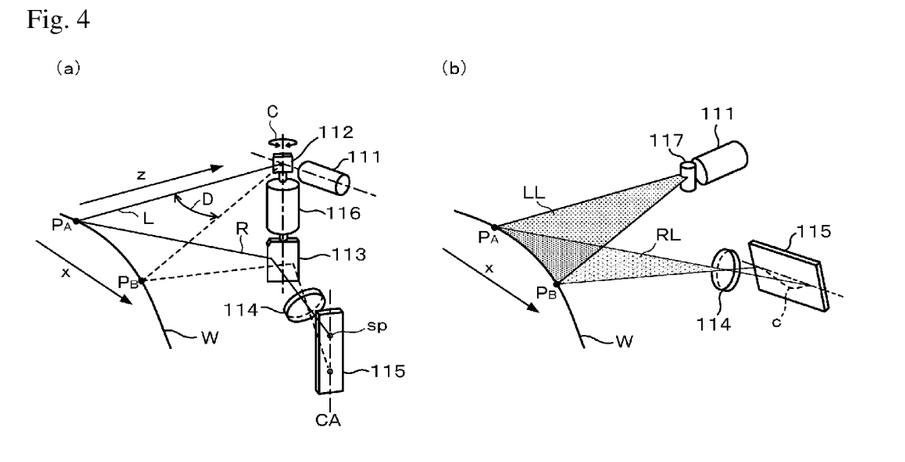
FIG. 4(a) illustrates an example of a non-contact sensor in a flying laser spot type.
FIG. 4(b) illustrates an example of a non-contact sensor in a fix line laser type.

An example of the above-described non-contact sensor 110 will be described with reference to FIG. 4. FIG. 4(a) illustrates an example of a non-contact sensor in a flying laser spot type. FIG. 4(b) illustrates an example of a non-contact sensor in a fix line laser type.

As illustrated in FIG. 4(a), the non-contact sensor in the flying laser spot type includes a laser diode 111, galvano mirrors 112 and 113, a lens 114, a CCD 115, and a scanning motor 116. The laser light L emitted from the laser diode 111 is reflected toward the workpiece W by the galvano mirror 112, and then the laser light L is reflected at a measurement point P on a surface of the workpiece W after passing through the light emitting window 14 (see FIG. 2). The reflected light R reflected at the measurement point P is reflected toward the lens 114 by the galvano mirror 113 after passing through the light receiving window 16 illustrated in FIG. 2.

The lens 114 causes the reflected light R to form an image as spot light (a point of light) sp on a predetermined axis CA of a light receiving unit of the CCD 115 including a plurality of light receiving elements. Imaging data of the spot light sp is output to the measurement control unit 100. A position of the spot light sp on the axis CA varies depending on a distance between the sensor head 10 and the measurement point P. The measurement control unit 100 (see FIG. 3) generates data including information regarding the distance between the sensor head 10 and the measurement point P based on the imaging data output from the CCD 115.

The galvano mirrors 112 and 113 described above are fixed to a driving shaft of the scanning motor 116. The driving shaft of the scanning motor 116 can rotate in a direction indicated by an arrow C in FIG. 4(a). As indicated by an arrow D, the laser light L is periodically scanned to reciprocate within a predetermined range on the x axis (e.g., between measurement points $P_A$ and $P_B$ on the surface of the workpiece W). The measurement control unit 100 transmits the measurement data to the personal computer 40. The measurement data includes information (Z) regarding a distance between the sensor head 10 and the measurement point P. The measurement data further includes information (X) regarding a position of the laser light L on the x axis. Therefore, the measurement data transmitted in a wireless manner from the sensor head 10 to the personal computer 40 can be expressed as (X, Z).

In a case where the non-contact sensor in the flying laser spot type is used, it is possible to adjust an intensity of laser light according to a state of the surface of the workpiece W (e.g., a color, a reflectance, or the like of the surface). Therefore, in a case where the non-contact sensor in the flying laser spot type is used, it is possible to measure a distance to the workpiece W with high accuracy. However, the non-contact sensor in the flying laser spot type has a complicated structure, and thus its cost is high.

As illustrated in FIG. 4(b), the non-contact sensor in the fix line laser type includes a laser diode 111, a cylindrical lens (or a Powell lens) 117, a lens 114, and a CMOS image sensor (hereinafter, referred to simply as "CMOS") 115. The cylindrical lens (or the Powell lens) 117 causes laser light emitted from the laser diode 111 to spread in the x-axis direction in FIG. 4(b). Therefore, the laser light emitted from the laser diode 111 becomes line light (one-line light) LL. The line light LL is irradiated toward a line from the measurement point $P_A$ to the measurement point $P_B$ on the surface of the workpiece W, after passes through the light emitting window 14 (see FIG. 2).

Figure 2:
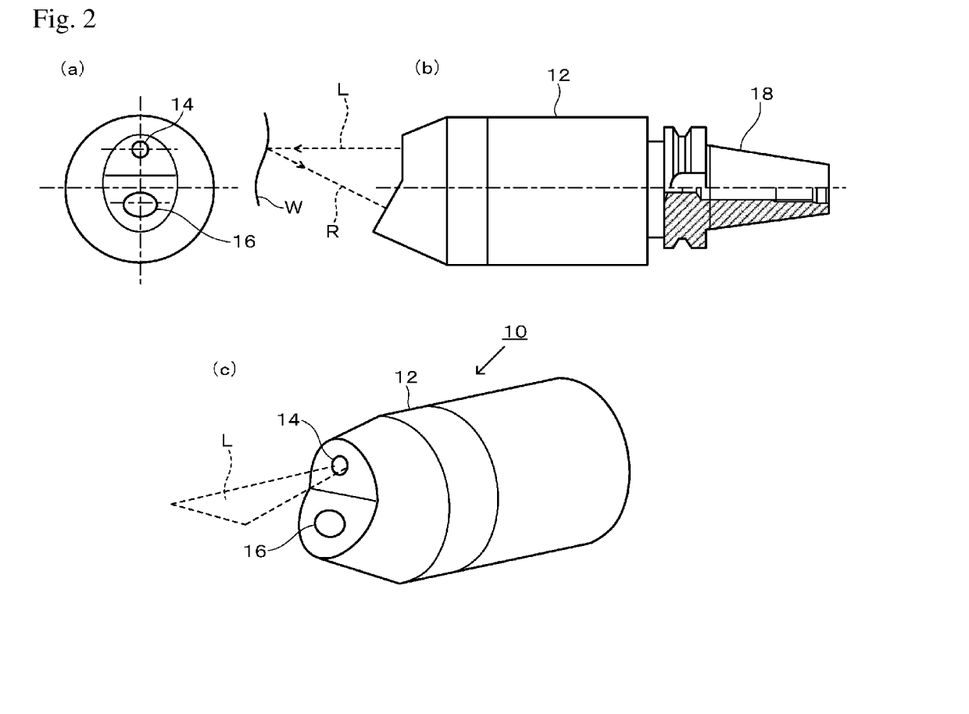
FIG. 2(a) is a front view of a sensor head.
FIG. 2(b) is a side view of the sensor head.
FIG. 2(c) is a perspective view illustrating an exterior of the sensor head.

The reflected light RL of the line light LL is condensed by the lens 114 to form an image on the light receiving unit of the CMOS 115, after passing through the light receiving window 16 (see FIG. 2). The formed image is line light, and is captured by the CMOS 115. The imaging data is output to the measurement control unit 100. The line light imaged by the CMOS 115 draws a curve c according to a shape from the measurement point $P_A$ to the measurement point $P_B$ on the workpiece W. Based on the curve c, the measurement control unit 100 calculates a distance between the sensor head 10 and a certain position on the line from the measurement point $P_A$ to the measurement point $P_B$. Then, the measurement control unit 100 transmits measurement data including information regarding the calculated distance to the personal computer 40 through the wireless LAN unit 102.

Unlike the non-contact sensor in the flying laser spot type illustrated in FIG. 4(a), the non-contact sensor in the fix line laser type is not capable of finely adjusting an intensity of laser light between the measurement point $P_A$ and the measurement point $P_B$. However, the non-contact sensor in the fix line type has a simple structure, thereby keeping its cost low.

Figure 5:
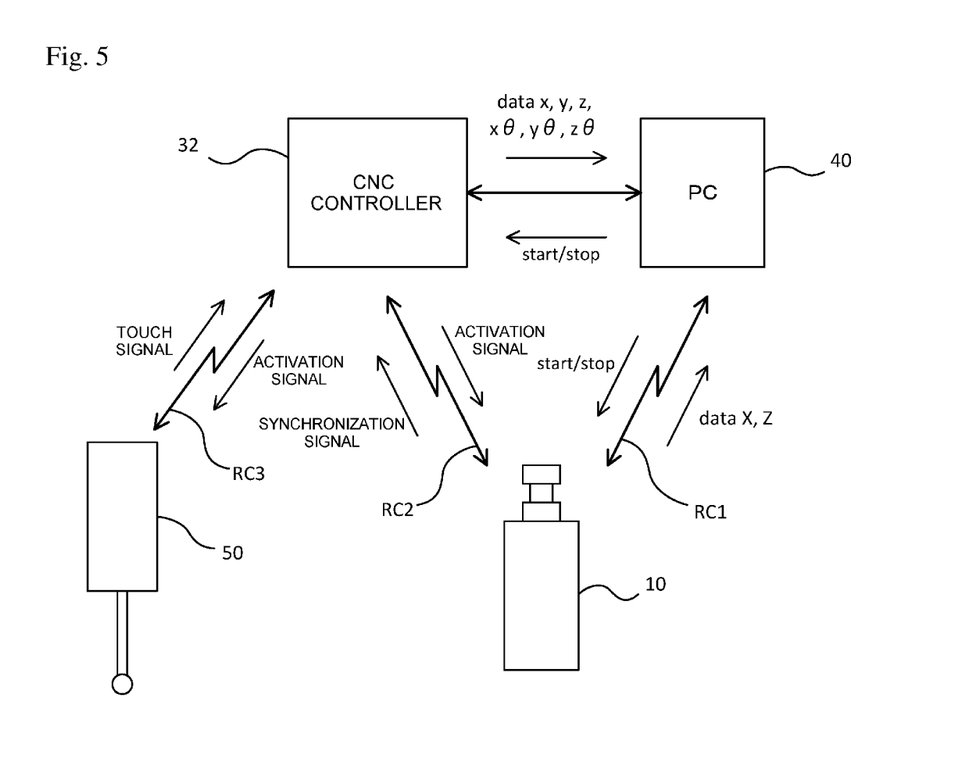
FIG. 5 is a block diagram illustrating a communication network configuration of the CNC machining device.

FIG. 5 is a block diagram illustrating a communication network configuration of the CNC machining device 1 according to the present embodiment. As illustrated in FIG. 5, the CNC machining device 1 according to the present embodiment includes a sensor head 10, a CNC controller 32, and a personal computer 40. The personal computer 40 and the CNC controller 32 are connected to each other by a wired LAN (e.g., a high-speed serial bus (HSSB) or fast Ethernet (registered trademark) (FE)). The sensor head 10 can communicate with the personal computer 40 through first radio communication RC1. Also, the sensor head 10 can communicate with the CNC controller 32 through second radio communication RC2 different from the first radio communication RC1. Any types of radio communication may be used for the first radio communication RC1 and the second radio communication RC2. Since the measurement data transmitted from the sensor head 10 to the personal computer 40 has a large size, it is preferable to use Wifi for the first radio communication RC1.

The measurement data (X, Z) acquired by the sensor head 10 is transmitted to the personal computer 40 through the first radio communication RC1. The personal computer 40 can accumulate the measurement data received from the sensor head 10, for example, in a hard disk.

In addition, the sensor head 10 transmits a synchronization signal for synchronizing the measurement data (X, Z) and the position coordinate data (x, y, z, xθ, yθ, zθ) to the CNC controller 32 through the second radio communication RC2.

The CNC controller 32 transmits position coordinate data (x, y, z, xθ, yθ, zθ) indicating a position and an orientation of spindle 26 to the personal computer 40. The personal computer 40 can store the position coordinate data received from the CNC controller 32, for example, in a hard disk.

The personal computer 40 can transmit, to the CNC controller 32, a command (start/stop) instructing the CNC controller 32 to start or stop acquiring position coordinate data.

The CNC controller 32 can transmit a signal for activating the sensor head 10 in a sleep state to the sensor head 10 through the second radio communication RC2.

In addition, the personal computer 40 can transmit, to the sensor head 10 through the first radio communication RC1, a command (start/stop) instructing the sensor head 10 to start or stop acquiring measurement data.

Next, a process of measuring a shape of a workpiece by the CNC machining device 1 according to the present embodiment will be described with reference to a flowchart of FIG. 6.

Figure 6:
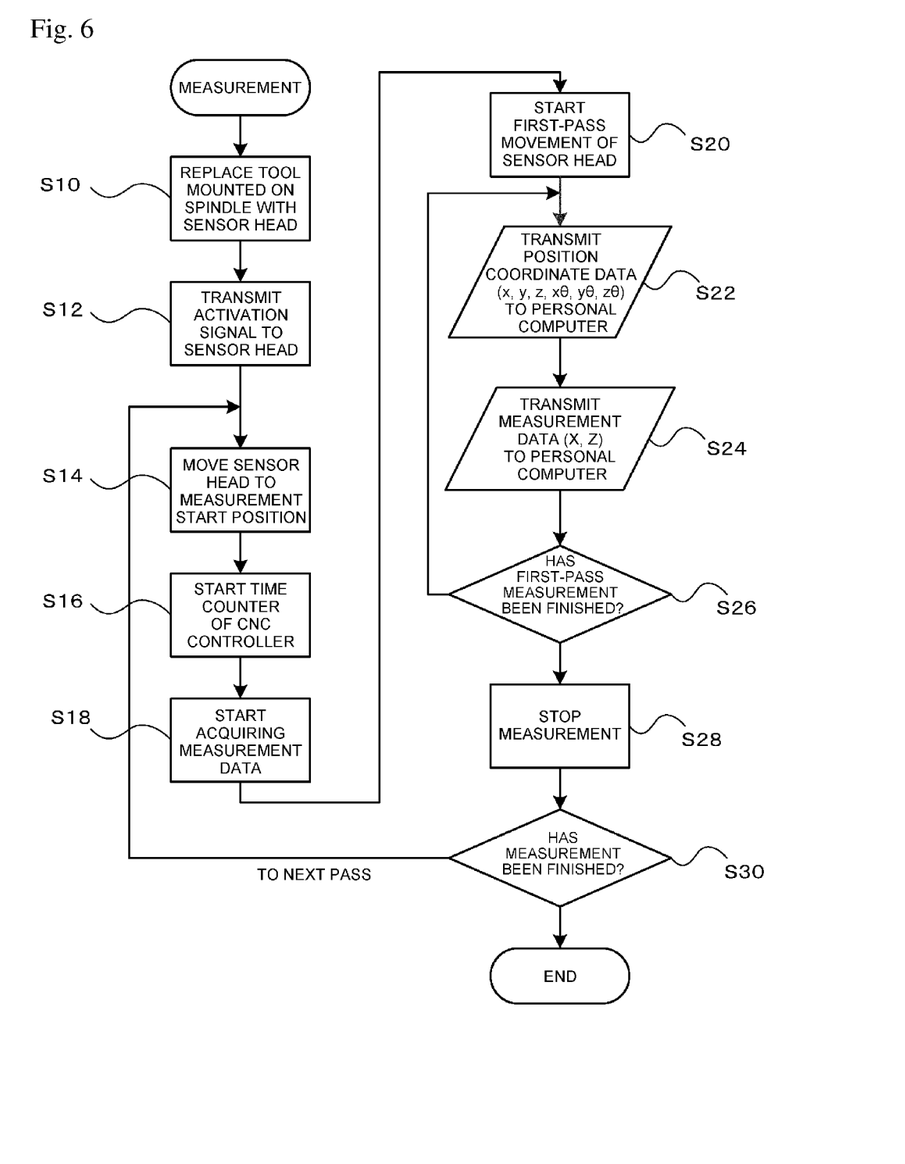
FIG. 6 is a flowchart illustrating a process of measuring a shape of a workpiece.

Note that the measurement process illustrated in the flowchart of FIG. 6 is an example, and the process of measuring a shape of a workpiece is not limited thereto.

First, a tool mounted on the spindle 26 is replaced with the sensor head 10 housed in the tool magazine 20. The intermediate arm 22 and the ATC arm 24 described above are used to replace the tool with the sensor head 10 (step S10).

After the step S10, the CNC controller 32 transmits a signal for activating the sensor head 10 in a sleep state to the sensor head 10 through the second radio communication RC2 (step S12).

After the step S12, the CNC controller 32 moves the sensor head 10 to a measurement start position (step S14).

After the step S14, a time counter of the CNC controller 32 is started. Accordingly, the CNC controller 32 acquires position coordinate data (x, y, z, xθ, yθ, zθ) indicating a position and an orientation of the spindle 26 at regular intervals (e.g., at intervals of 1 msec) (step S16).

After the step S16, the sensor head 10 starts acquiring measurement data (X, Z). The sensor head 10 acquires measurement data at regular intervals (e.g., at intervals of 10 msec) (step S18).

After the step S18, the CNC controller 32 starts a first-pass movement of the sensor head 10. At the same time of starting the first-pass movement along a surface of the workpiece, the sensor head 10 consecutively acquires measurement data (X, Z) including information regarding a distance to the surface on the movement route (step S20). One-pass movement of the sensor head 10 corresponds to "a unit of one-time measurement" of the present invention.

After the step S20, the CNC controller 32 transmits the position coordinate data (x, y, z, xθ, yθ, zθ) to the personal computer 40 (step S22).

After the step S22, the sensor head 10 transmits the measurement data (X, Z) to the personal computer 40 (step S24).

After the step S24, the CNC controller 32 determines whether or not the sensor head 10 has finished the first-pass measurement (step S26). When it is determined that the first-pass measurement has not been finished, the process returns to the step S22 and data transmission is continued. When it is determined that the first-pass measurement has been finished, the measurement by the sensor head 10 is stopped (step S28).

After the step S28, the CNC controller 32 determines whether or not the measurement has been finished (step S30). When it is determined that the measurement has been finished, the process of measuring a surface shape of a workpiece ends. When it is determined that the measurement has not been finished, the process returns to the step S14 to start second-pass measurement.

Next, a method of synchronizing measurement data (X, Z) and position coordinate data (x, y, z, xθ, yθ, zθ) using a synchronization signal will be described with reference to FIGS. 7 to 9.

Figure 7:
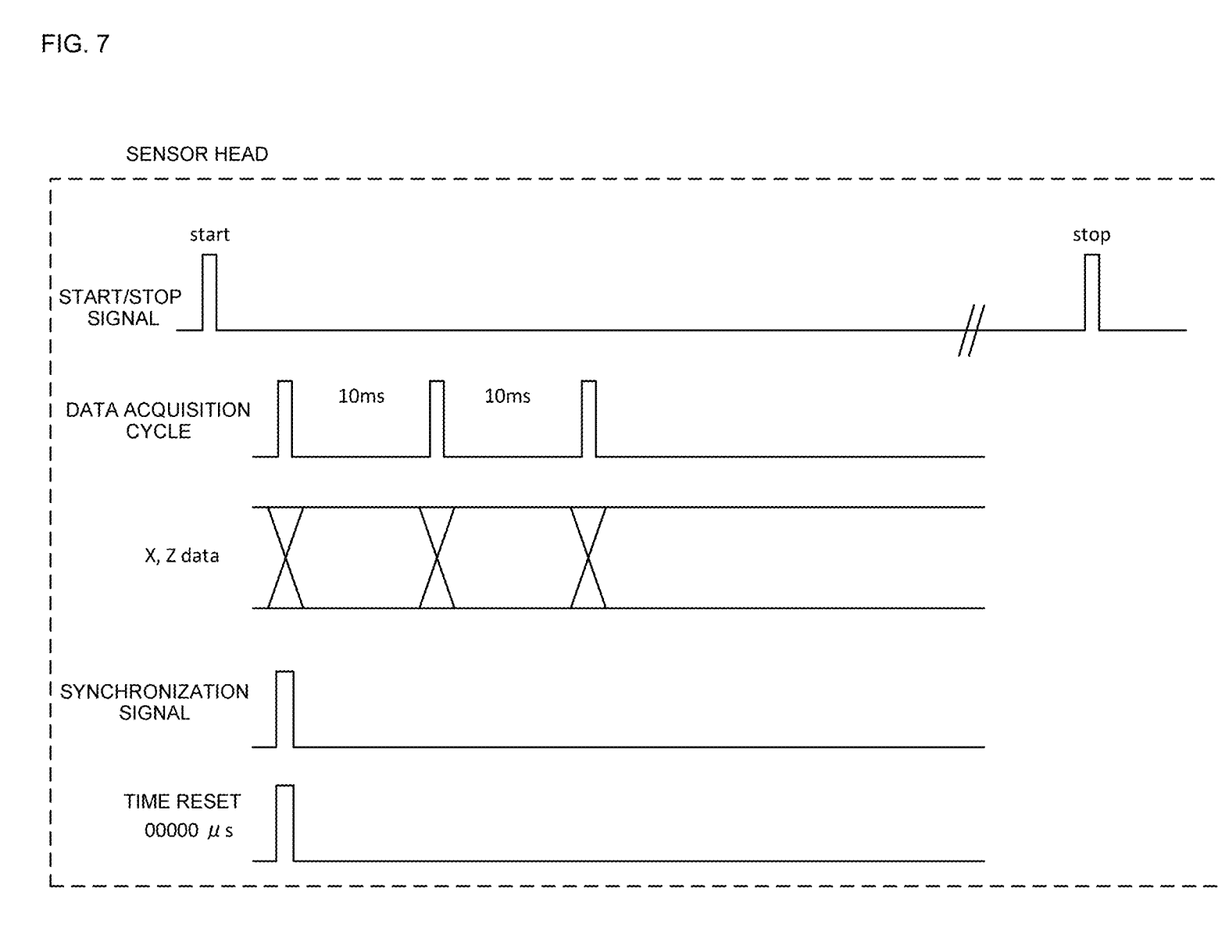
FIG. 7 is a diagram illustrating a relationship between a timing at which measurement data is acquired by the sensor head and a timing at which a synchronization signal is output from the sensor head.

FIG. 7 is a diagram illustrating a relationship between a timing at which measurement data (X, Z) is acquired by the sensor head 10 and a timing at which a synchronization signal is output from the sensor head 10. As illustrated in FIG. 7, at regular intervals (e.g., at intervals of 10 msec), the sensor head 10 acquires measurement data (X, Z) and transmits the acquired measurement data to the personal computer 40 through the first radio communication RC1. In addition, the sensor head 10 outputs a synchronization signal only once at the time of starting measurement. The synchronization signal output from the sensor head 10 is transmitted to the CNC controller 32 through the second radio communication RC2.

Figure 8:
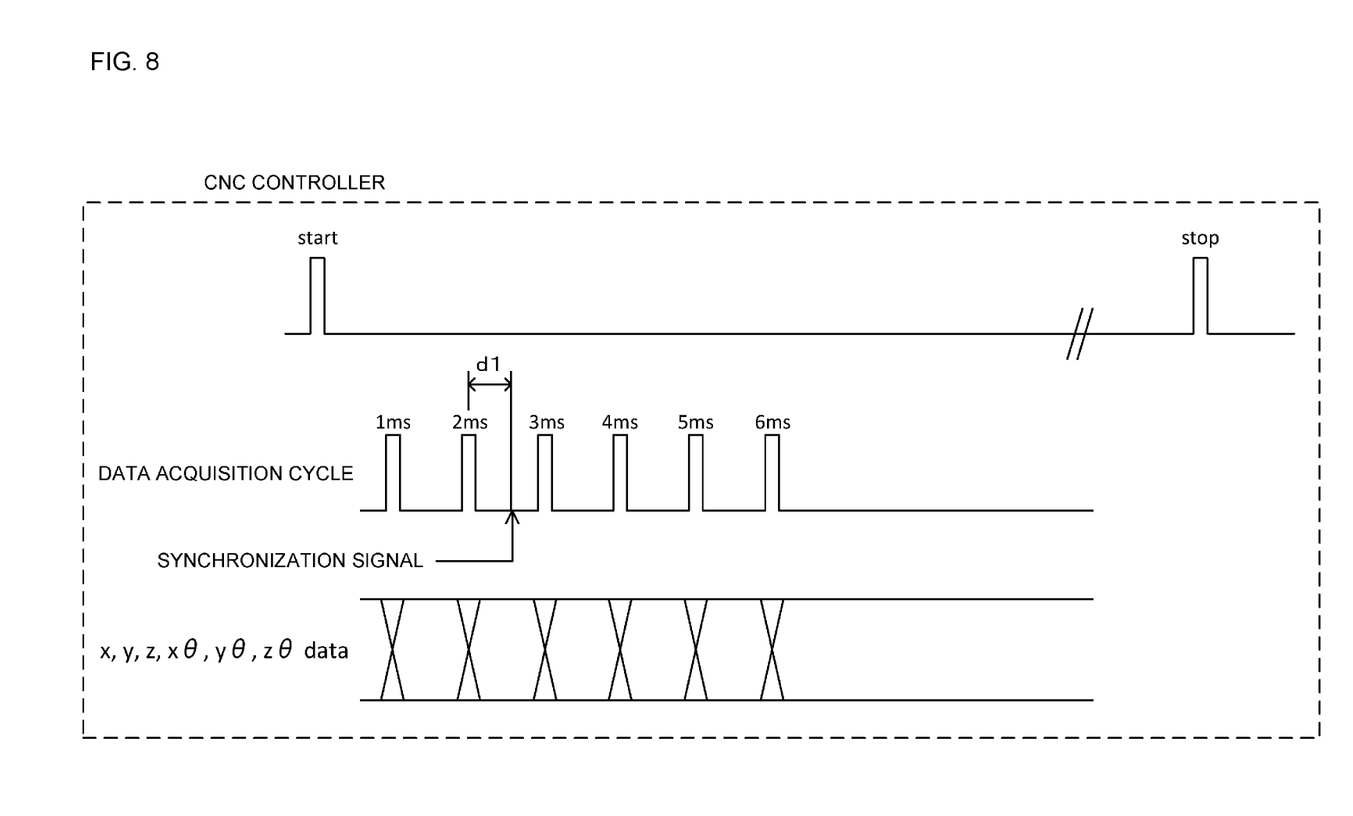
FIG. 8 is a diagram illustrating a relationship between a timing at which position coordinate data is acquired by the CNC controller and a timing at which the CNC controller receives a synchronization signal.

FIG. 8 is a diagram illustrating a relationship between a timing at which position coordinate data (x, y, z, xθ, yθ, zθ) is acquired by the CNC controller 32 and a timing at which the CNC controller 32 receives a synchronization signal transmitted from the sensor head 10. As illustrated in FIG. 8, at regular intervals (e.g., at intervals of 1 msec), the CNC controller 32 acquires position coordinate data indicating a position and an orientation of the spindle 26 and transmits the acquired position coordinate data to the personal computer 40.

As illustrated in FIG. 8, there is a difference between a timing at which the sensor head 10 outputs a synchronization signal and a timing at which the CNC controller 32 receives the synchronization signal. Such a difference is related to a time taken until the synchronization signal output from the sensor head 10 reaches the CNC controller 32. Such a difference can be considered in view of two different types of times delays d1 and d2.

d1 denotes a time between a timing at which the CNC controller 32 receives a synchronization signal and a timing at which the CNC controller 32 acquires position coordinate data immediately before receiving the synchronization signal (see FIG. 8). For example, in a case where the CNC controller 32 acquires position coordinate data every 1 millisecond, d1 is smaller than 1 millisecond. The CNC controller 32 has a function for detecting such a time delay d1.

d2 denotes a time between a timing at which the sensor head 10 outputs a synchronization signal and a timing at which the CNC controller 32 receives the synchronization signal. This is a delay time of the second radio communication RC2. This delay time is substantially constant (e.g., 2 ms±0.01 ms) by devising the modulation of the second radio communication RC2.

Figure 9:
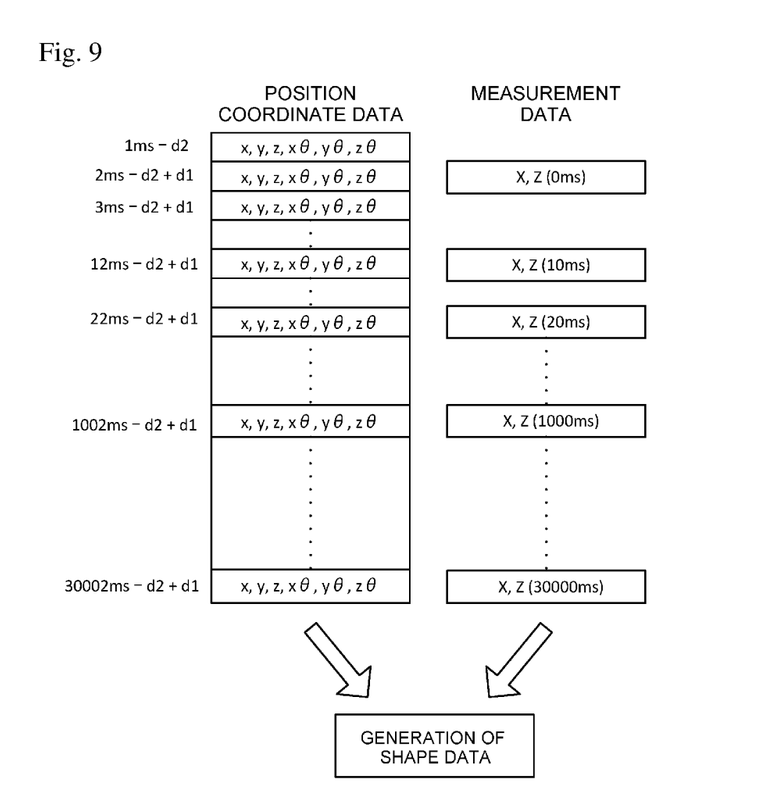
FIG. 9 is a diagram illustrating a relationship between measurement data (X, Z) and position coordinate data (x, y, z, xθ, yθ, zθ) accumulated in a personal computer.

FIG. 9 illustrates a relationship between measurement data (X, Z) and position coordinate data (x, y, z, xθ, yθ, zθ) accumulated in the personal computer 40. As illustrated in FIG. 9, the measurement data (X, Z) transmitted from the sensor head 10 is accumulated in the personal computer 40 in order of time. Each piece of the measurement data is associated with information regarding a time at which the data is acquired. Also, the position coordinate data (x, y, z, xθ, yθ, zθ) transmitted from the CNC controller 32 is accumulated in the personal computer 40 in order of time.

The measurement data (X, Z) is acquired at regular intervals (e.g., at intervals of 10 milliseconds).

The position coordinate data (x, y, z, xθ, yθ, zθ) is also acquired at regular intervals (e.g., at intervals of 1 millisecond).

Since a synchronization signal is output from the sensor head 10 to the CNC controller 32 only once at the time of starting measurement, it is possible to associate measurement data and position coordinate data acquired at the same time point using this synchronization signal as a starting point.

Hereinafter, in order to simplify the description, milliseconds may be referred to as "ms".

For example, when the CNC controller 32 receives a synchronization signal in 2 to 3 ms from the start of measurement, position coordinate data of (2 ms−d2+d1) corresponds to measurement data (X, Z) at a time point (0 ms) when the synchronization signal is output.

Similarly, position coordinate data of (12 ms−d2+d1) corresponds to measurement data of (10 ms). Position coordinate data of (22 ms−d2+d1) corresponds to measurement data of (20 ms). Position coordinate data of (1002 ms−d2+d1) corresponds to measurement data of (1000 ms). Position coordinate data of (30002 ms−d2+d1) corresponds to measurement data of (30000 ms). When position coordinate data is acquired every 1 ms, the position coordinate data between two consecutive time points can be calculated by interpolation.

In this manner, the position coordinate data and the measurement data can be synchronized with each other using a synchronization signal received by the CNC controller 32 as a starting point. Based on the synchronized data, the personal computer 40 can generate data indicating a surface shape of the workpiece.

Note that although it has been described as an example in the above embodiment that the sensor head 10 outputs the synchronization signal once at the beginning of the measurement, the present invention is not limited to such an aspect.

In a case where a measurement distance (or time) is very long, measurement accuracy may decrease due to an error of the counter of the CNC controller 32 or an error of the counter of the sensor head 10. In this case, the sensor head 10 may output a synchronization signal multiple times, for example, during one-time measurement (one-pass measurement). For example, in a case where the sensor head 10 moves along 1000 lines during one-time measurement (one-pass measurement), a synchronization signal may be output once every 4 lines, or a synchronization signal may be output once every 100 lines.

As illustrated in FIG. 5, the CNC machining device 1 may further include a contact sensor 50 in addition to the sensor head 10 having a non-contact sensor. For example, the contact sensor 50 includes a touch probe. A touch signal acquired by the contact sensor 50 may be transmitted to the CNC controller 32 via third radio communication RC3. The touch signal received by the CNC controller 32 may be accumulated, for example, in a hard disk as contact-type point data (x, y, z, xθ, yθ, zθ) for that time point.

An acceleration sensor may be installed in the sensor head 10. The acceleration sensor may detect an acceleration acting on the sensor head 10. Then, at a timing when the acceleration sensor detects an acceleration greater than or equal to a predetermined value, the sensor head 10 may specify measurement data (X, Z) for that time point and add a delay time to the data. The term "specify" as used herein refers to marking or flagging data. For example, at the time of starting measurement, an impact may be applied to the sensor head 10 during a short period in a direction other than the moving direction of the sensor head 10 (e.g., an axial direction of the spindle 26). As a result, it is possible to cause an acceleration greater than or equal to a predetermined value to act on the sensor head 10 at the time of starting measurement.

Figure 10:
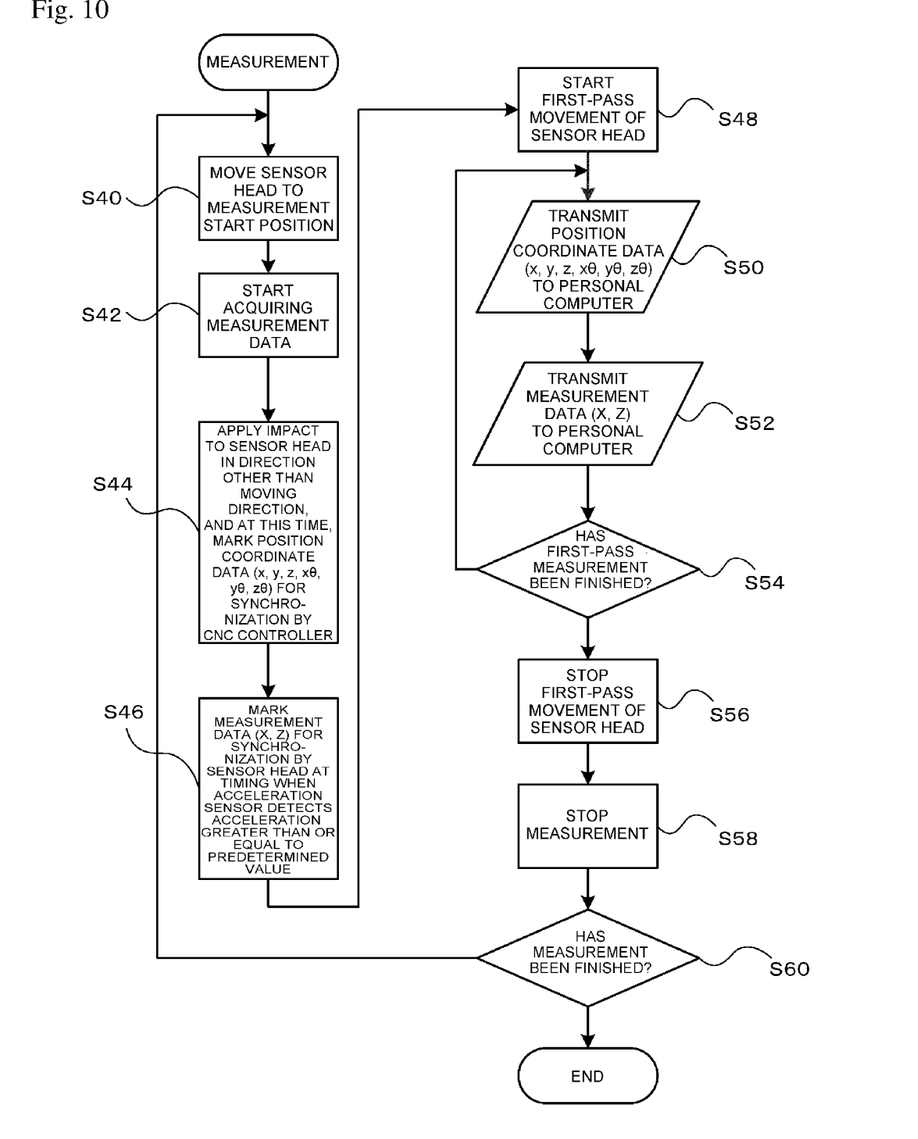
FIG. 10 is a flowchart illustrating an example in which, at a timing when an acceleration greater than or equal to a predetermined value is detected by an acceleration sensor, the sensor head outputs a synchronization signal.

FIG. 10 is a flowchart illustrating an example in which, at a timing when an acceleration greater than or equal to a predetermined value is detected by the acceleration sensor, the sensor head 10 specifies measurement data (X, Z) for that time point.

First, the CNC controller 32 moves the sensor head 10 to a measurement start position (step S40).

After the step S40, the sensor head 10 starts acquiring measurement data (X, Z). The sensor head 10 acquires measurement data at regular intervals (e.g., at intervals of 10 msec) (step S42).

After the step S42, the CNC controller 32 applies a large impact to the sensor head 10 in a direction other than the moving direction of the sensor head 10 (step S44). At this time, the CNC controller 32 applying an impact marking (flagging) consecutively acquired position coordinate data (x, y, z, xθ, yθ, zθ) for synchronization (step S44).

At a timing when the acceleration sensor detects an acceleration greater than or equal to a predetermined value, the sensor head 10 marks (flags) measurement data (X, Z) for synchronization (step S46).

After the step S46, the CNC controller 32 starts a first-pass movement of the sensor head 10. At the same time of starting the first-pass movement along a surface of the workpiece, the sensor head 10 consecutively acquires measurement data (X, Z) including information regarding a distance to the surface on the movement route (step S48).

After the step S48, the CNC controller 32 transmits the position coordinate data (x, y, z, xθ, yθ, zθ) to the personal computer 40 (step S50).

After the step S50, the sensor head 10 transmits the measurement data (X, Z) to the personal computer 40 (step S52).

After the step S52, the CNC controller 32 determines whether or not the sensor head 10 has finished the first-pass measurement (step S54). When it is determined that the first-pass measurement has not been finished, the process returns to the step S50 and data transmission is continued. When it is determined that the first-pass measurement has been finished, the CNC controller 32 stops the first-pass movement of the sensor head 10 (step S56), and then stops the measurement by the sensor head 10 (step S58).

After the step S58, the CNC controller 32 determines whether or not the measurement has been finished (step S60). When it is determined that the measurement has been finished, the process of measuring a surface shape of a workpiece ends. When it is determined that the measurement has not been finished, the process returns to the step S40 to start second-pass measurement.

According to the above-described embodiment, position coordinate data (x, y, z, xθ, yθ, zθ) and measurement data (X, Z) are marked at a timing when an impact is applied to the sensor head 10. That is, since the position coordinate data and the measurement data acquired at the same time point can be specified, these data can be synchronized.

The CNC machining device 1 according to the present embodiment is capable of more accurately synchronizing measurement data (X, Z) acquired by the sensor head 10 and position coordinate data (x, y, z, xθ, yθ, zθ) acquired by the CNC controller 32, thereby more accurately measuring a surface shape of an object.

REFERENCE SIGNS LIST

1 CNC machining device
10 Sensor head (measurement unit)
20 Tool magazine (housing unit)
22 Intermediate arm
24 ATC arm
26 Spindle (rotation shaft)
32 CNC controller
40 Personal computer (processing device)
50 Contact sensor
RC1 First radio communication
RC2 Second radio communication
RC3 Third radio communication
W Workpiece (object)

The invention claimed is:

1. A CNC machining device measuring a surface shape of an object after machining the object with a tool, the CNC machining device comprising:
a housing unit configured to house a plurality of tools; a rotation shaft configured to rotate the tool; an automatic tool replacing device configured to replace the tool mounted on the rotation shaft with one of the plurality of tools housed in the housing unit; a CNC controller configured to control an operation of the rotation shaft; a measurement unit configured to generate measurement data corresponding to a distance from a surface of the object; and a processing device connected to the CNC controller,
wherein the automatic tool replacing device is configured to replace the tool mounted on the rotation shaft with the measurement unit,
the measurement unit generates the measurement data at regular intervals,
the CNC controller generates position coordinate data indicating a position and an orientation of the rotation shaft at regular intervals, and
the measurement unit transmits the measurement data to the processing device through first radio communication, and transmits a synchronization signal for synchronizing the measurement data with the position coordinate data to the CNC controller through second radio communication.

2. The CNC machining device according to claim 1, wherein the measurement unit outputs the synchronization signal once every unit of one-time measurement.

3. The CNC machining device according to claim 1, wherein the measurement unit outputs the synchronization signal multiple times within a unit of one-time measurement.

4. The CNC machining device according to claim 1, wherein the measurement unit outputs the synchronization signal once at the time of starting measurement.

5. The CNC machining device according to claim 1, wherein the measurement unit includes an acceleration sensor, and marks the measurement data for synchronization when an acceleration greater than or equal to a predetermined value is detected by the acceleration sensor.

6. The CNC machining device according to claim 1, wherein the processing device synchronizes the measurement data and the position coordinate data based on the synchronization signal.

7. The CNC machining device according to claim 1, wherein the processing device generates surface shape data of the object based on the measurement data and the position coordinate data.

8. The CNC machining device according to claim 1, wherein the CNC controller continues performing a measurement after receiving the second radio communication.

9. The CNC machining device according to claim 1, wherein the CNC controller has improved measurement accuracy after receiving the second radio communication.

10. The CNC machining device according to claim 1, wherein the CNC controller controls orientation of the rotation shaft after receiving the second radio communication.

11. The CNC machining device according to claim 1, wherein the CNC controller controls orientation of the rotation shaft during a measurement of a shape of an object after receiving the second radio communication.

12. The CNC machining device according to claim 1, wherein the position coordinate data and the measurement data are synchronized with each other using the synchronization signal received by the CNC controller as a starting point.

13. The CNC machining device according to claim 1, wherein based on the synchronized data, the processing device generates data indicating a surface shape of the workpiece from the measurement.

* * * * *